(12) United States Patent
Huynh et al.

(10) Patent No.: US 9,908,633 B2
(45) Date of Patent: Mar. 6, 2018

(54) VARIABLE-CAPTURE SUPERSONIC INLET

(71) Applicant: The Boeing Company, Chicago, IL (US)

(72) Inventors: Thuy Huynh, Ofallon, MO (US); David J. Wilson, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/674,170

(22) Filed: Mar. 31, 2015

(65) Prior Publication Data
US 2016/0288917 A1    Oct. 6, 2016

(51) Int. Cl.
*B64D 33/02* (2006.01)
*F02C 7/042* (2006.01)
*B64C 1/00* (2006.01)

(52) U.S. Cl.
CPC ............ *B64D 33/02* (2013.01); *B64C 1/0009* (2013.01); *F02C 7/042* (2013.01); *B64D 2033/026* (2013.01)

(58) Field of Classification Search
CPC ... F02C 7/042; B64D 33/02; B64D 2033/026; B64D 2033/0273
See application file for complete search history.

(56) References Cited

U.S. PATENT DOCUMENTS

| | | | | |
|---|---|---|---|---|
| 3,067,573 A | * | 12/1962 | Connors | F02C 7/042 138/46 |
| 3,242,671 A | * | 3/1966 | Moorehead | F02C 7/042 137/15.1 |
| 3,974,648 A | | 8/1976 | Kepler | |
| 7,837,142 B2 | * | 11/2010 | Chase | B64C 30/00 244/110 B |
| 8,857,760 B2 | * | 10/2014 | Brown | B64C 11/001 244/53 B |
| 2013/0087661 A1 | * | 4/2013 | Brown | B64C 11/001 244/201 |

FOREIGN PATENT DOCUMENTS

GB    761235 A    11/1956
GB    926345 A    5/1963

* cited by examiner

*Primary Examiner* — Brian M O'Hara
(74) *Attorney, Agent, or Firm* — Felix L. Fischer

(57) ABSTRACT

An engine inlet for efficient operation at both design Mach number and off-design Mach numbers has a fixed compression surface and a leading edge that is variably extendible over the fixed compression surface to simultaneously vary capture area, compression and shock wave position.

14 Claims, 16 Drawing Sheets

VARIABLE-CAPTURE SUPERSONIC INLET

BACKGROUND INFORMATION

Field

Embodiments of the disclosure relate generally to supersonic inlets for aircraft jet engines and more particularly to an inlet adjustable to simultaneously vary capture area and compression.

Background

Engine inlets for supersonic aircraft have complex aerodynamic requirements based on Mach number and other flight conditions. Inlet aperture is typically located to provide optimum performance at a nominal design Mach number. To provide necessary flow control a compression surface may be employed in conjunction with the inlet aperture. For simplicity of design, the compression surface is typically fixed. However, inefficiency associated with operation at off-design Mach numbers where mass flow exceeds engine need requires excess air to be spilled or bypassed. Additionally at off-design Mach numbers, the shock waves generated by the compression surface and the resulting compression effects may not be ideal for desired performance.

It is therefore desirable to provide an inlet which will help improve performance at off-design Mach numbers by adjusting inlet area to minimize or avoid requirements to bypass or spill excess air and simultaneously modifies the shock waves generated by the compression surface.

SUMMARY

Exemplary embodiments provide an engine inlet for efficient operation at both design Mach number and off-design Mach numbers having a fixed compression surface and a leading edge that is variably extendible over the fixed compression surface to simultaneously vary capture area, compression and shock wave position.

The embodiments provide a method for simultaneous modification of capture area and compression for an aircraft inlet with a fixed compression surface. A leading edge of an inlet is established on a cowl. An aircraft with the inlet is operated at a design Mach number with the leading edge and cowl fully retracted. The aircraft is operated at speeds less than the design Mach number with an extension of the leading edge over a compression surface to simultaneously vary compression and inlet area.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The system and methods described herein provide embodiments for an inlet having a leading edge variably extendible over a fixed compression surface to simultaneously vary capture area and compression. The inlet leading edge may be configured on a cowl to pivot about a remote axis perpendicular to the direction of airflow and transverse to the compression surface. The capture area is adjusted by extension and retraction of the cowl and leading edge to match mass flow with engine need and/or align with off-design shock waves from the compression surface. Thereby minimizing or obviating excess airflow to be spilled or caused to bypass the inlet. The inlet is also configured such that as the leading edge is retracted with increasing speed and increasing amount of compression surface is exposed thereby increasing the capture area. The position of the inlet leading edge relative to the fixed compression surface also causes the compression to vary and repositions the shock waves created by the compression surface. Pivoting the inlet cowl about a remote axis with mating scrubbing surfaces in the inlet flow path defined by the radius to the axis and consistent with desired flow turning into a diffuser for the aircraft engine provides for a simple mechanism to simultaneously vary capture area, compression and shock wave position to enhance efficiency.

Figure 1A:
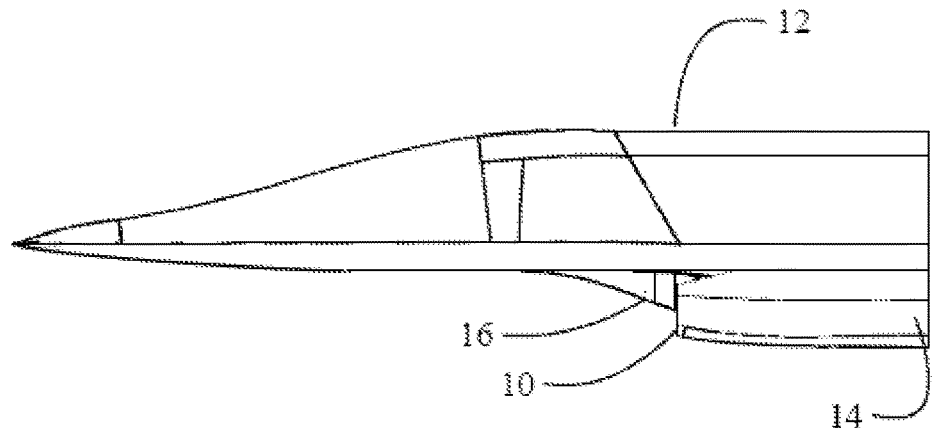
FIG. 1A is side view of a portion of an aircraft having an inlet according to an exemplary embodiment as described herein.
Figure 1B:
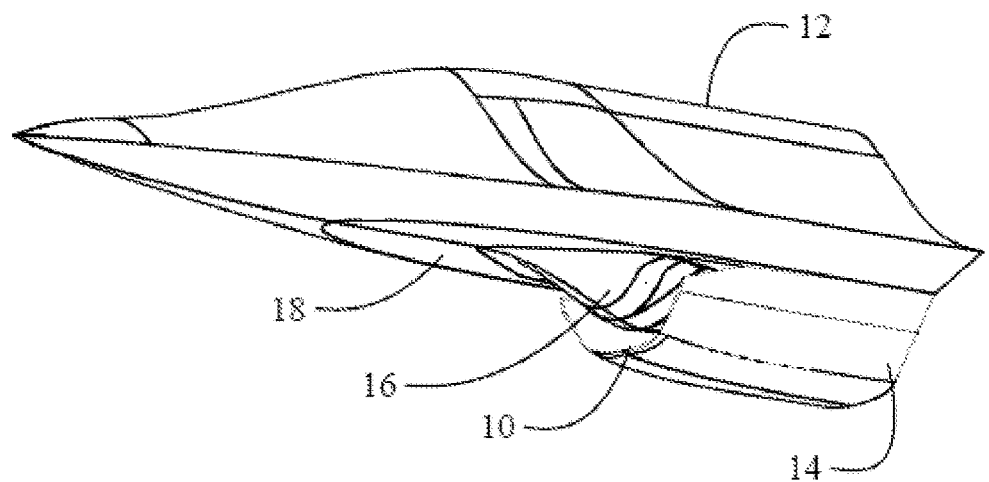
FIG. 1B is a perspective view of a fuselage portion and associated inlet with a fixed compression surface of the embodiment of FIG. 1A.
Figure 1C:
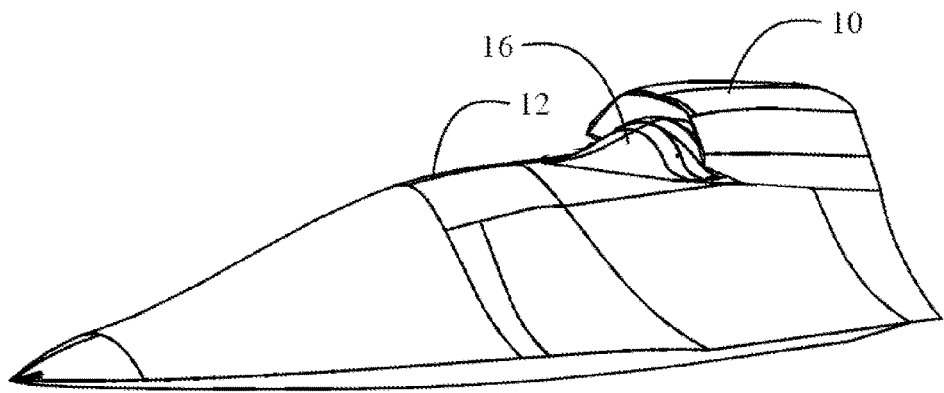
FIGS. 1C-1G show alternative inlet locations for the embodiment disclosed herein.
Figure 1D:
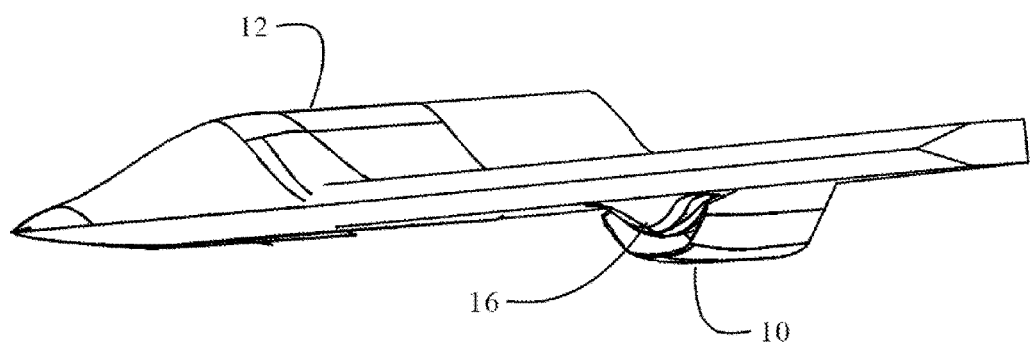
Figure 1E:
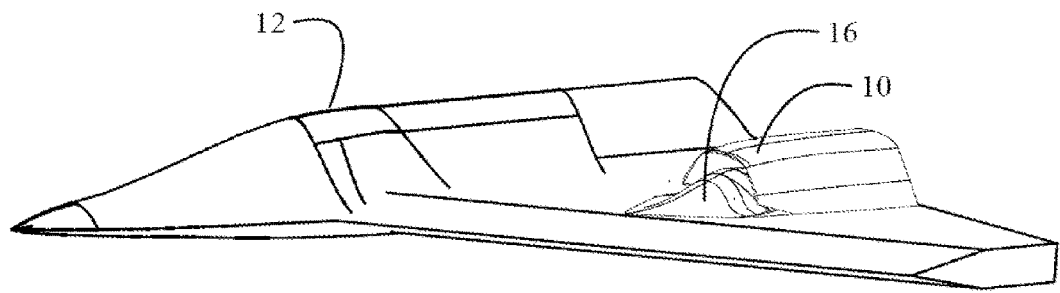
Figure 1F:
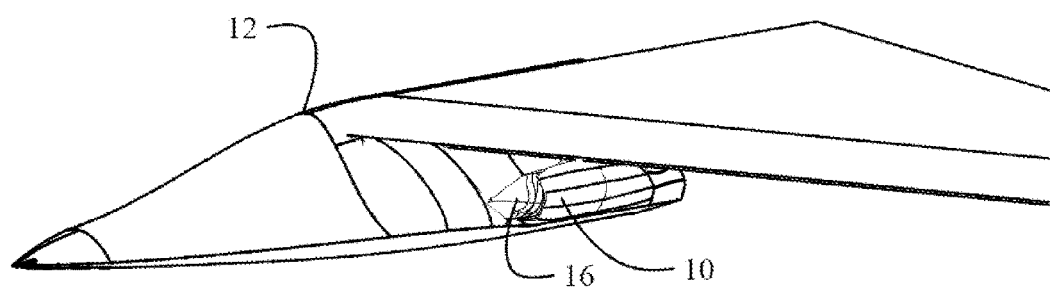
Figure 1G:
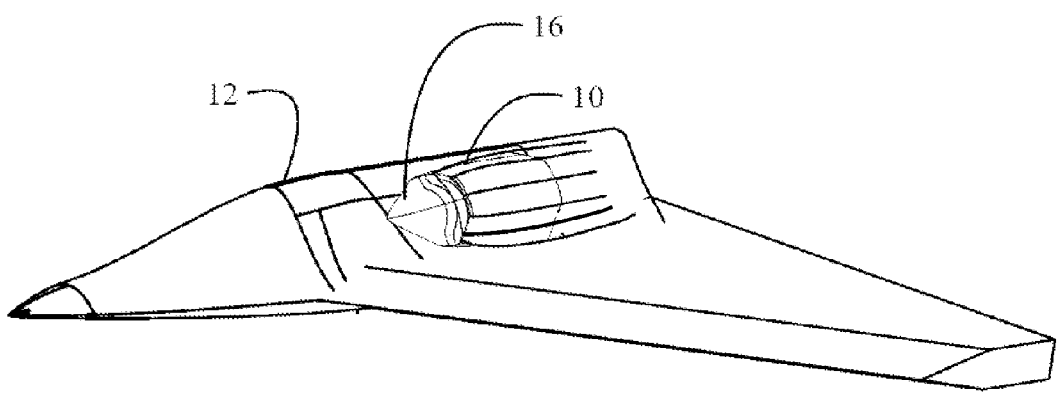

Referring to the drawings, FIGS. 1A and 1B show representative portions of an exemplary aircraft employing the embodiments of an inlet as disclosed herein. An inlet 10 is placed under a fuselage 12. While shown in the exemplary embodiment in the drawings as an under fuselage (chin) inlet, alternative embodiments may be employed in fuselage top, over-wing or under-wing, under wing root (armpit) and over wing root (shoulder) installations as seen in FIGS. 1C-1G respectively. A diffuser 14 extends from the inlet 10 to a jet engine (not shown) which is carried in the fuselage for the exemplary embodiments. A compression surface 16 is present on a bottom surface 18 of the fuselage 12 or other aerodynamic structure of the aircraft for cooperative operation with the inlet.

Figure 2A:
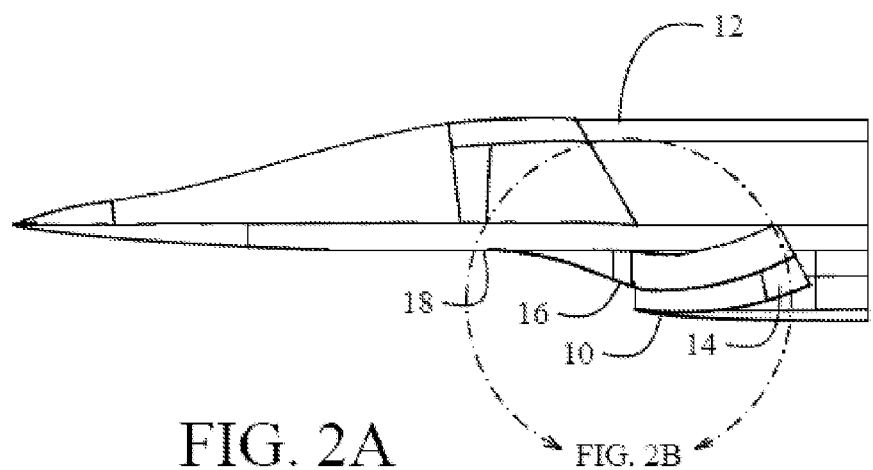
FIG. 2A is side partial section view of the aircraft of FIG. 1A showing the inlet in section.
Figure 2B:
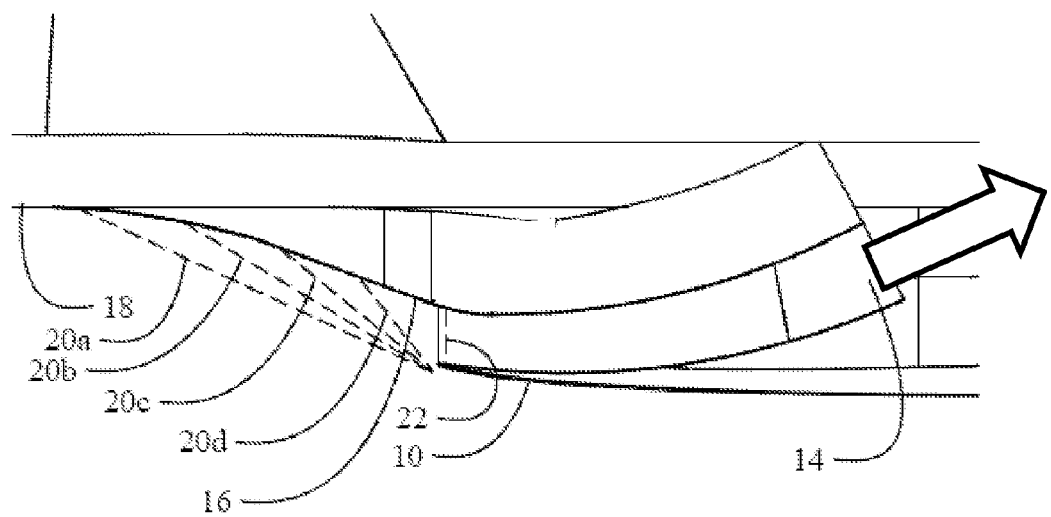
FIG. 2B is a detailed view of the side section of the inlet of FIG. 2B operating at design Mach number with the fixed.

The inlet 10 configured for operation at the design Mach number is shown in FIGS. 2A and 2B. The compression surface 16 may be either a single ramp or an isentropic system for creating the desired compression at the inlet. As seen in FIG. 2B, a series of shock waves (represented by exemplary shock waves 20a-20d) are created by the compression surface 16 yielding the desired compression at the inlet with creation of a normal shock 22 in the inlet aperture. The leading edge 24 of the inlet 10 is positioned at the design Mach number to create a nominal area of the inlet aperture in conjunction with the compression surface 16 for desired performance, as will be described in greater detail subsequently. As seen in the section view, the inlet transitions into a diffuser 14 for introduction of flow into the engine. The inlet and diffuser are contoured with a curvature to provide flow turning into the engine buried in the aircraft fuselage.

Figure 3:
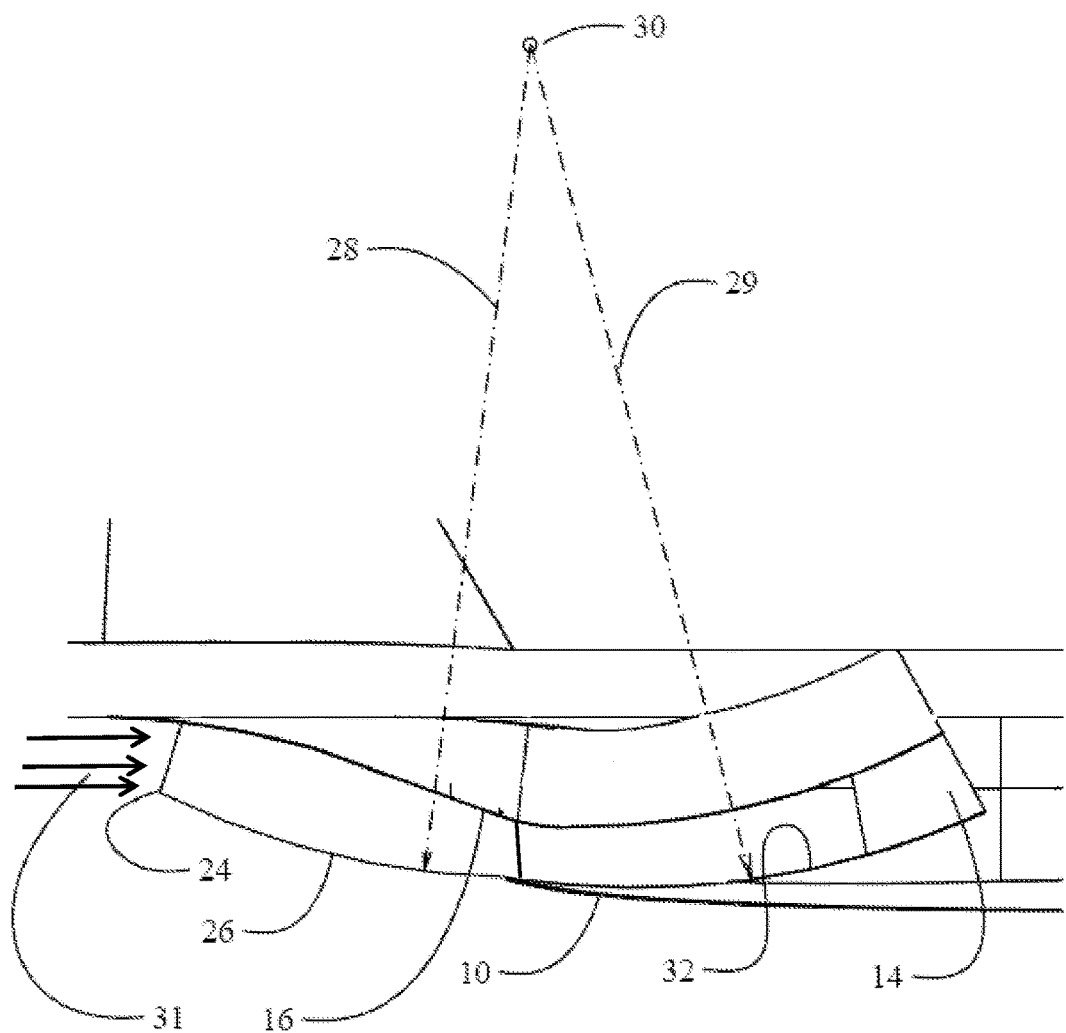
FIG. 3 is a detailed side section view of the inlet with an extended leading edge covering the fixed compression surface.

For operation at speeds less than the design Mach number, the inlet 10 is provided with a cowl 26 which incorporates the leading edge 24 as seen in FIG. 3. The cowl 26 is movable to extend and retract the leading edge 24 across a range of positions from a fully retracted position as seen in FIG. 2B to a fully extended position as seen in FIG. 3. In the fully extended position, the leading edge substantially covers the compression surface. The cowl 26 is curved and during extension of the leading edge, the effective area of the inlet aperture is reduced, as will be described in greater detail subsequently. For the embodiment shown, the cowl has a radius 28 from a remote axis 30 perpendicular to the direction of airflow into the inlet, as indicated by arrows 31 and transverse to the fixed compression surface. A mating scrubbing surface 32 having a radius 29 from the remote axis extended for thickness of the cowl 26 is fixed on the interior of the inlet 10 and engages the cowl for rotation about the remote axis to extend and retract the cowl and leading edge 24 while maintaining a substantially smooth aerodynamic surface for turning of the flow into the diffuser 14. Operation of the aircraft at subsonic speeds is accomplished with the cowl 26 and leading edge 24 in the fully extended position.

Figure 4A:
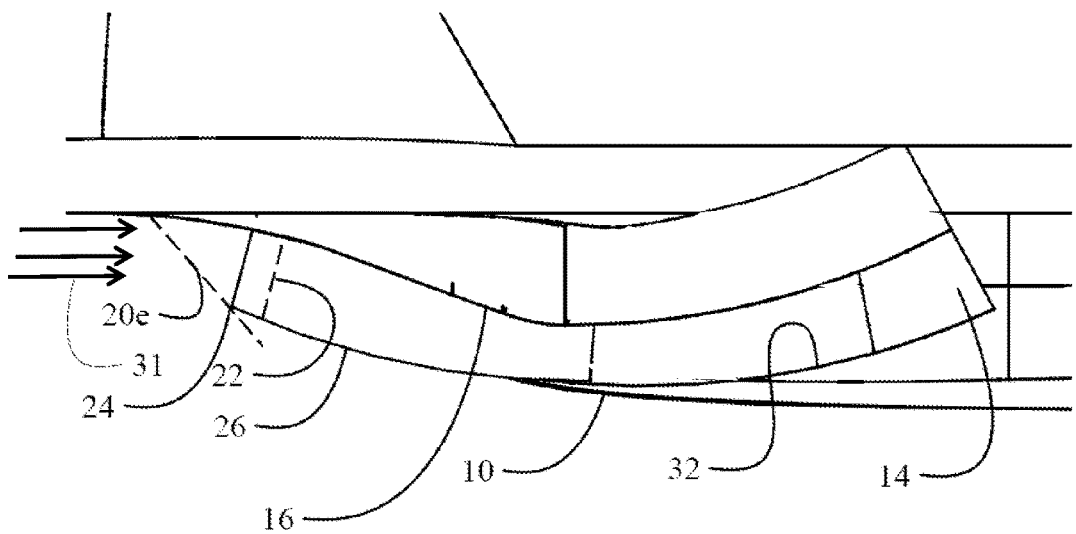
FIG. 4A is a detailed side section view of the inlet with the leading edge retracted to a first intermediate position showing exemplary shock wave positions.
Figure 4B:
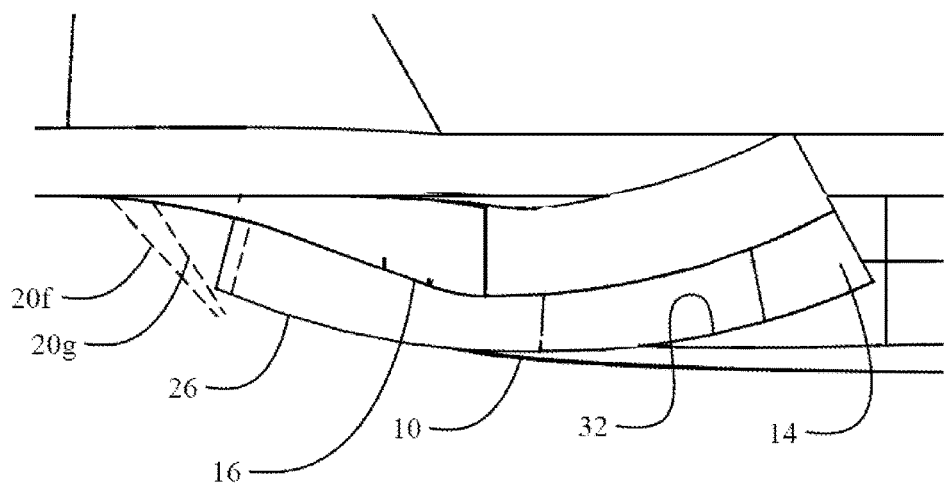
FIG. 4B is a detailed side section view of the inlet with the leading edge retracted to a second intermediate position.
Figure 4C:
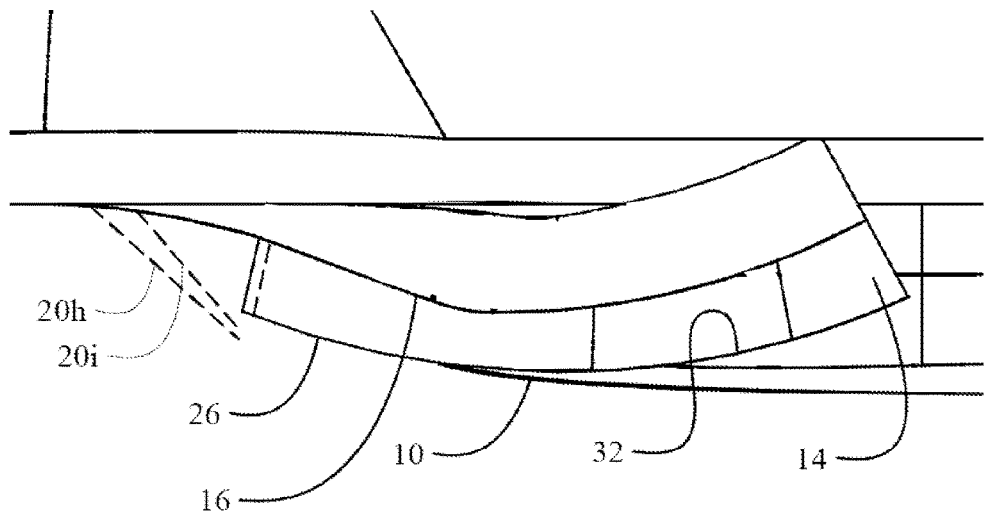
FIG. 4C is a detailed side section view of the inlet with the leading edge retracted to a third intermediate position.
Figure 4D:
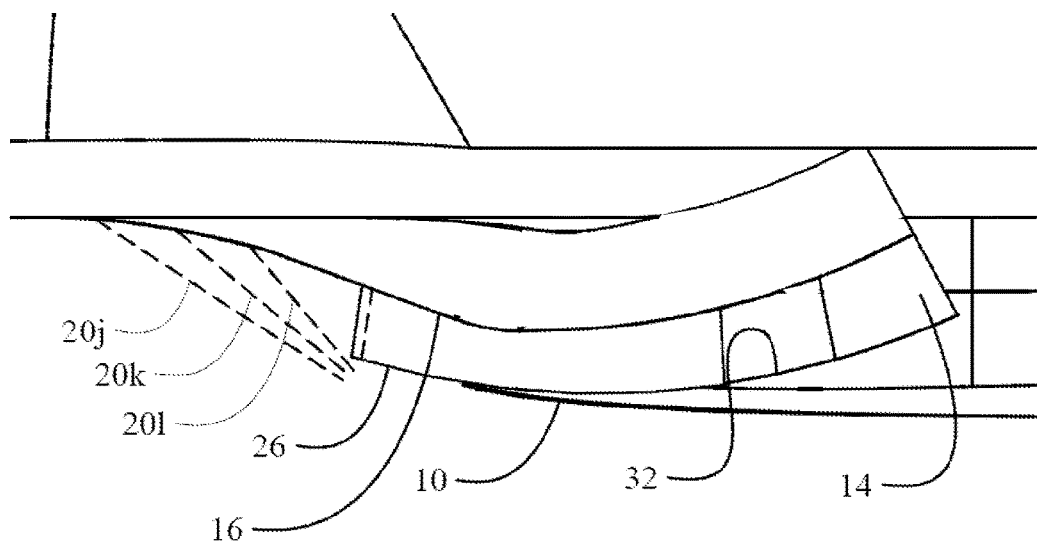
FIG. 4D is a detailed side section view of the inlet with the leading edge retracted to a fourth intermediate position.
Figure 4E:
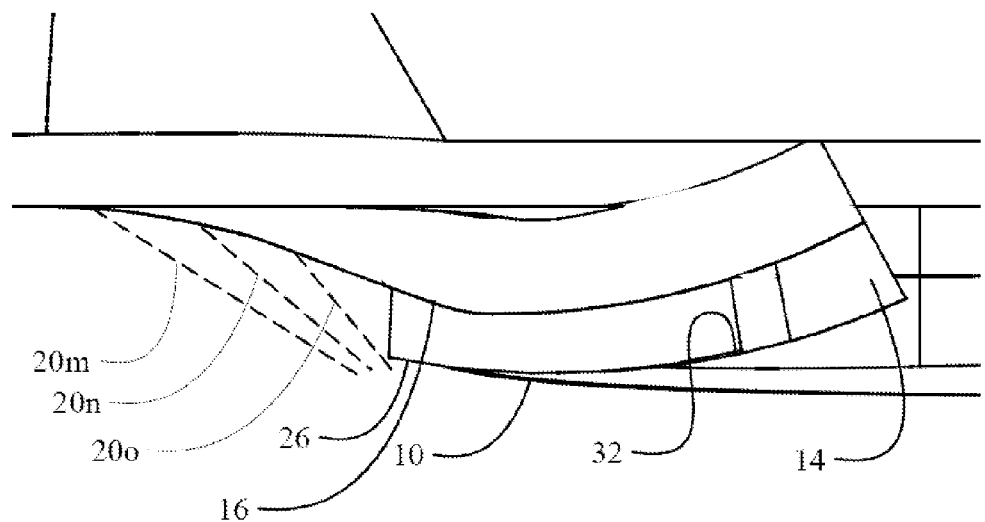
FIG. 4E is a detailed side section view of the inlet with the leading edge retracted to a fifth intermediate position.
Figure 4F:
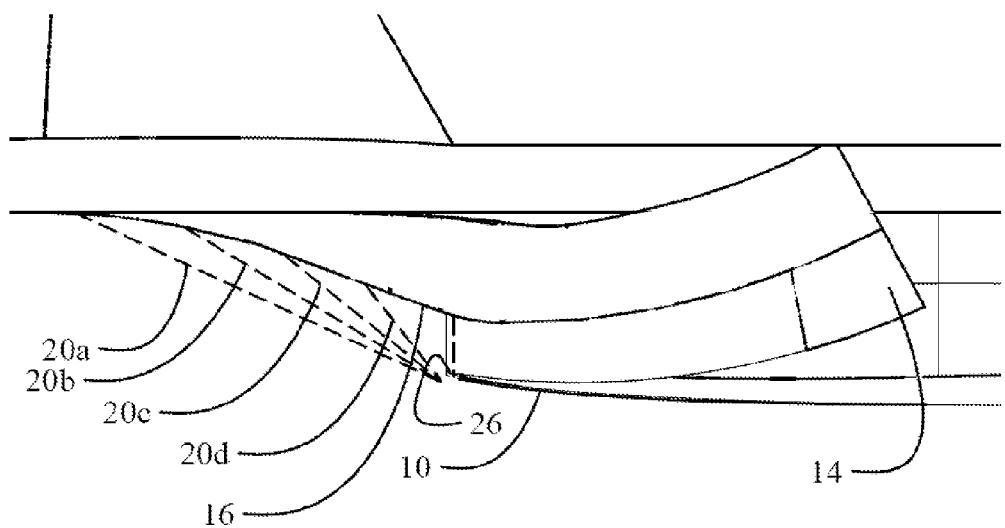
FIG. 4F is a detailed side section view of the inlet with the leading edge fully retracted to the design Mach number position showing exemplary shock wave positions.

As speed of the aircraft is increased, the cowl 26 is retracted, rotating about the remote axis 30. In a first representative position seen in FIG. 4A, the leading edge 24 is positioned to expose an initial portion of the fixed compression surface 16 which generates a first desired compression condition with associated positioning of shock wave 20e. With further increase in speed, the cowl 26 is retracted further as seen in FIG. 4B which exposes a greater portion of the fixed compression surface 16 generating a second desired compression condition with positioning of shock waves 20f and 20g. Further retraction of the cowl 26 with increasing speeds is shown in FIGS. 4C-4E with additional exposure of the compression surface 16 at each position. The varying compression created by the compression surface is with positioning of the representative shock waves 20h and 20i (FIG. 4C), 20j, 20k and 20l (FIG. 4D) and 20m, 20n and 20o (FIG. 4E). At the fully retracted condition when the aircraft reaches the design Mach number shown in FIG. 4F, the cowl exposes the maximum extent of the compression surface 16 with commensurate compression defined by shock waves 20a-20d as previously described with respect to FIG. 2B.

Figure 5A:
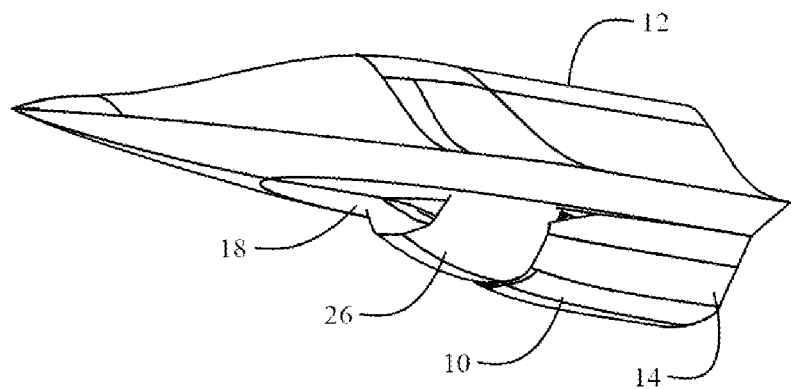
FIG. 5A is a pictorial view of the aircraft fuselage and inlet with the leading edge in the fully extended position.
Figure 5B:
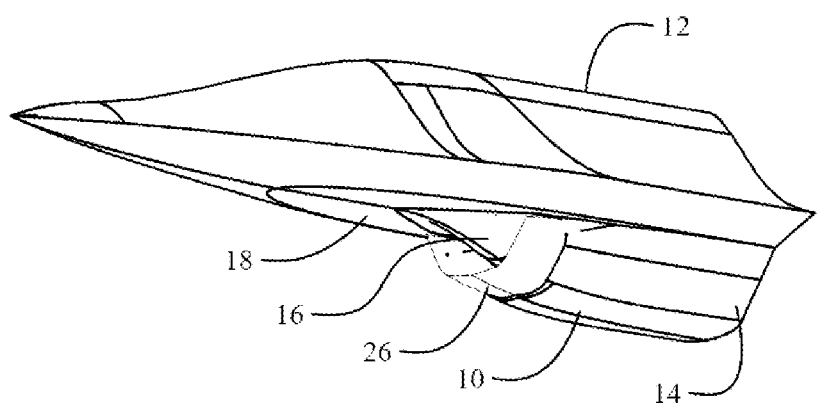
FIG. 5B is a pictorial view of the aircraft fuselage and inlet with the leading edge in an intermediate extended position.
Figure 5C:
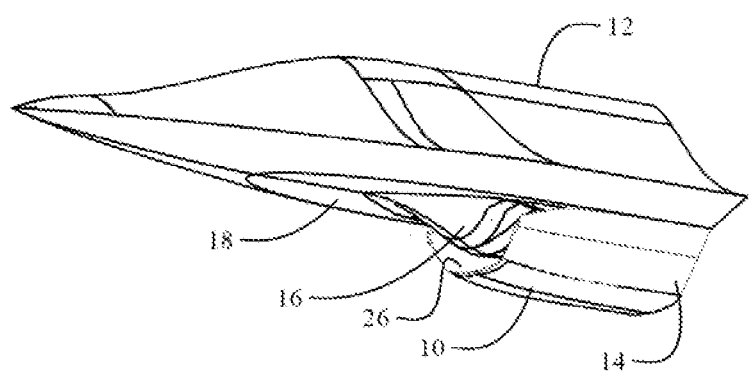
FIG. 5C is a pictorial view of the aircraft fuselage and inlet with the leading edge in the fully retracted position.
Figure 6A:
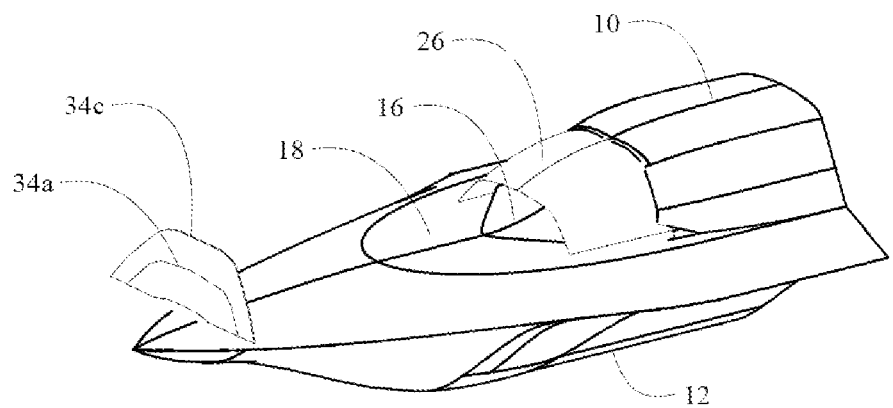
FIG. 6A is a pictorial view of the aircraft fuselage and inlet inverted with the leading edge in the fully extended position showing relative inlet area.
Figure 6B:
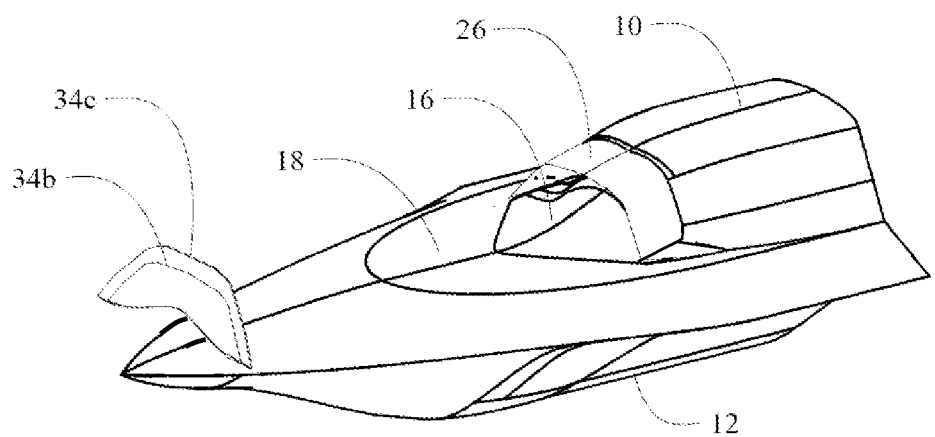
FIG. 6B is a pictorial view of the aircraft fuselage and inlet inverted with the leading edge in the intermediate extended position showing relative inlet area.
Figure 6C:
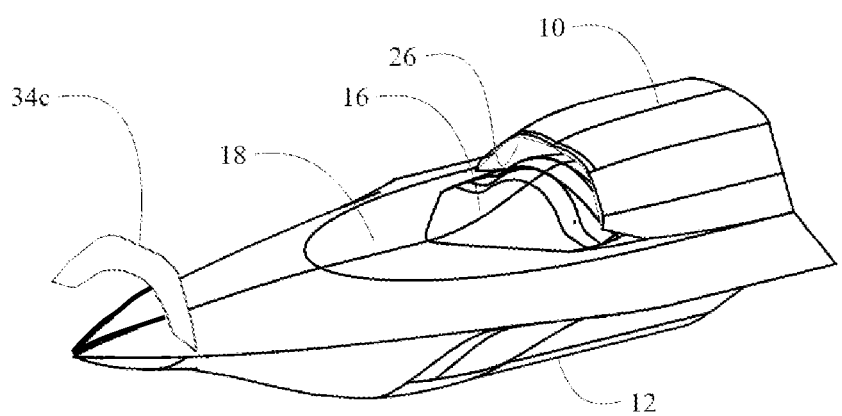
FIG. 6C is a pictorial view of the aircraft fuselage and inlet inverted with the leading edge in the fully retracted position showing relative inlet area.

An exemplary three dimensional (3D) configuration of the inlet 10 with the cowl 26 is shown in FIGS. 5A-5C with the cowl in the fully extended position, retracted to a mid-position, and fully retracted to the design Mach number position respectively. As seen in corresponding FIGS. 6A-6C with the 3D configuration inverted for clarity, the effective area of the inlet aperture represented in the figures as elements 34a, 34b and 34c is altered by the relative position of the cowl. As seen in FIG. 6A with the cowl 26 in the fully extended position the effective area 34a is significantly reduced over the maximum area 34c over which it is superimposed. In the mid-position of FIG. 6B, the effective area 32b is greater than area 34a but remains less than maximum area 34c. With the cowl 26 fully retracted, the effective area 34c is provided as seen in FIG. 6C. Within the limits of effective flow turning in the inlet and diffuser, the area "turn down" which may be achieved by the extension of the cowl is determined by the radius 28 (location of the axis 30). A reduced radius provides greater reduction in effective inlet area from fully retracted to fully extended.

Figure 7:
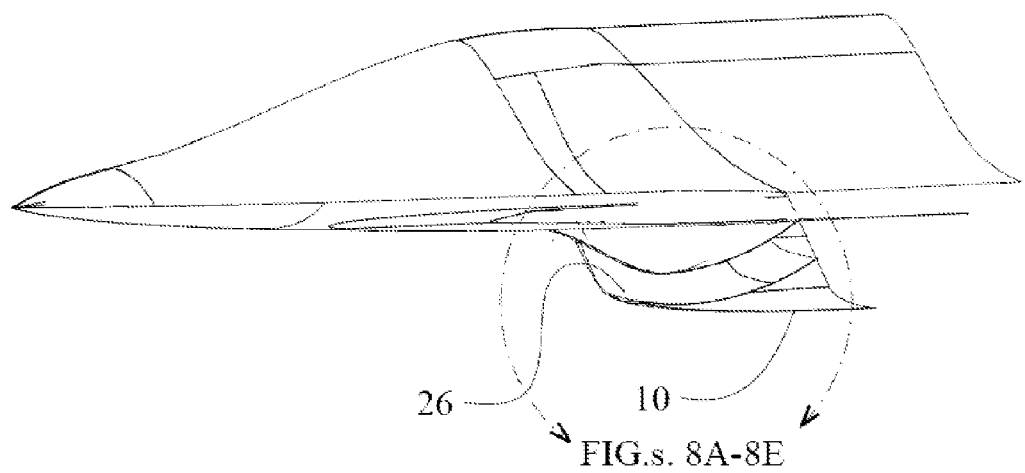
FIG. 7 is a pictorial section view of the aircraft fuselage and inlet with the leading edge in the fully retracted position showing a structural implementation of the cowl for extending the inlet leading edge.
Figure 8A:
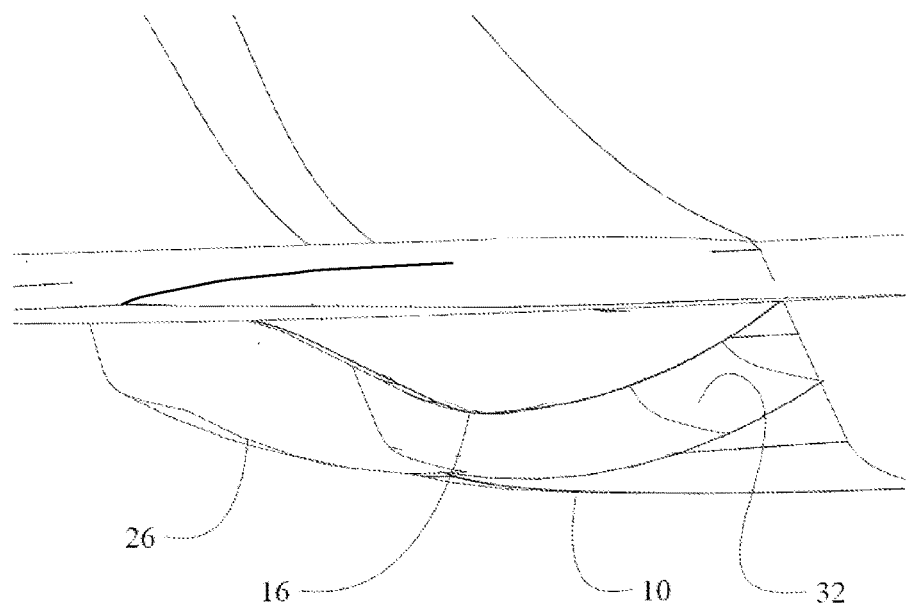
FIG. 8A is a pictorial detailed section view of the inlet of FIG. 7 with the cowl in the fully extended position showing the exposed scrubbing surface receiving the cowl.
Figure 8B:
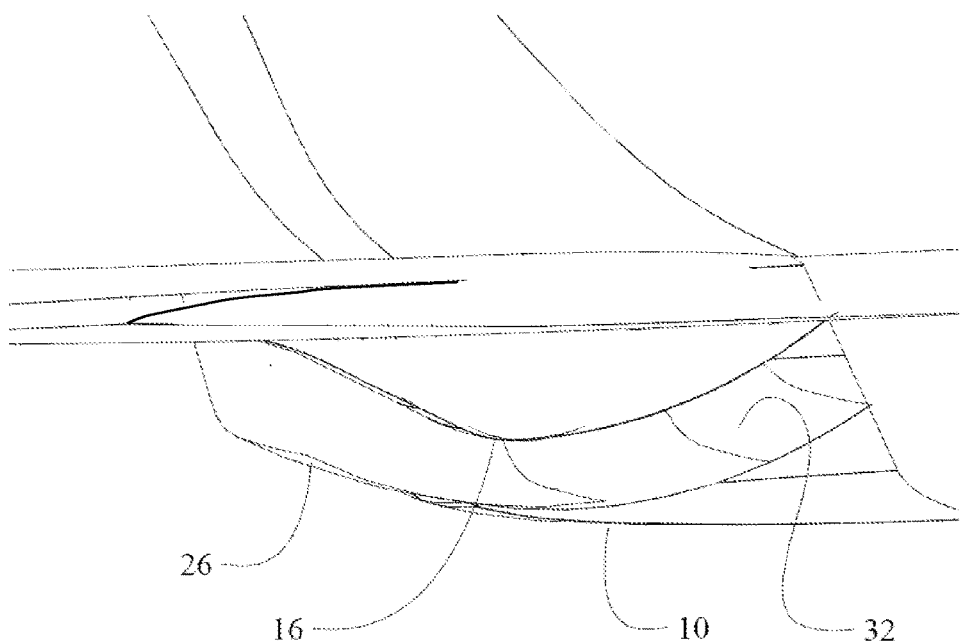
FIG. 8B is a pictorial detailed section view of the inlet of FIG. 7 with the cowl in a first partially retracted position.
Figure 8C:
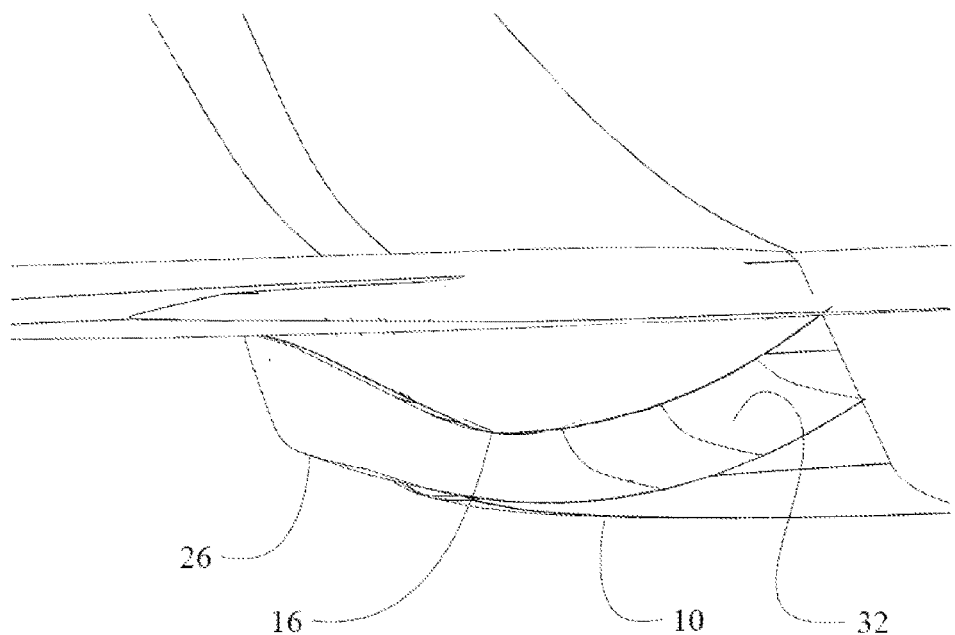
FIG. 8C is a pictorial detailed section view of the inlet of FIG. 7 with the cowl in a second partially retracted position.
Figure 8D:
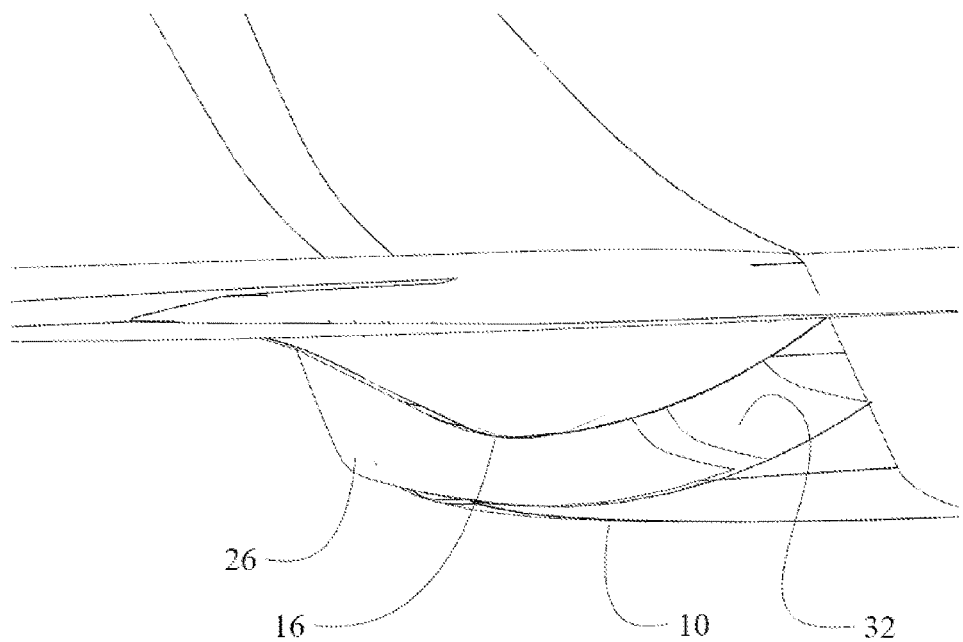
FIG. 8D is a pictorial detailed section view of the inlet of FIG. 7 with the cowl in a third partially retracted position.
Figure 8E:
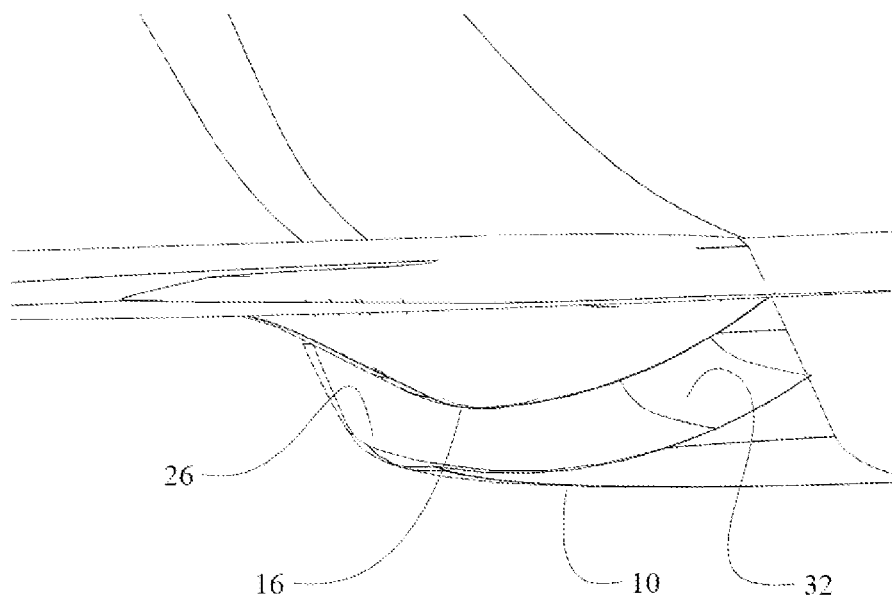
FIG. 8E is a pictorial detailed section view of the inlet of FIG. 7 with the cowl in a fully retracted position for operation at design Mach number; and, FIG. 9 is a flow chart for a method to operate a variable leading edge for matched off-design performance in an inlet having a fixed compression surface.
Figure 9:
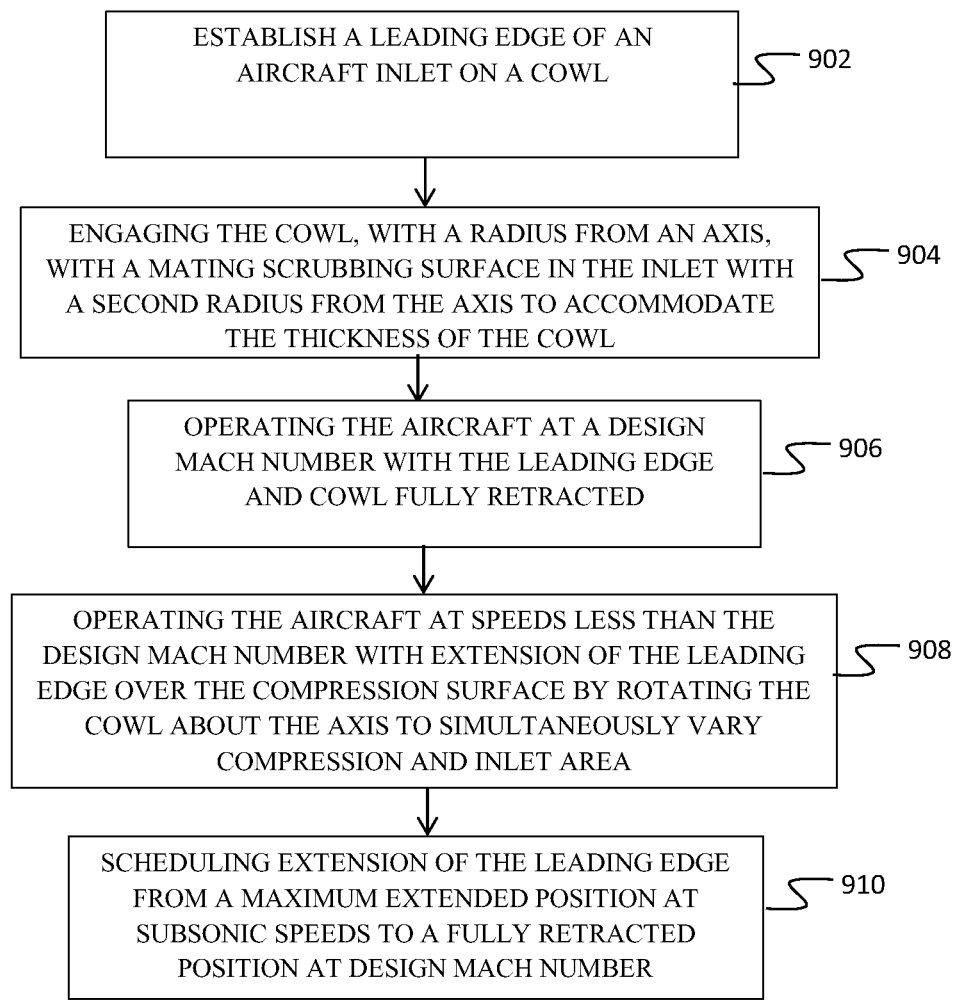

The exemplary 3D inlet configuration is shown in section in FIG. 7 with detailed views of the cowl 26 and mating scrubbing surfaces 32 shown in FIGS. 8A-8E in a range of positions from fully extended (FIG. 8A) to fully retracted for operation at the design Mach number (FIG. 8E). The intimate integration of the scrubbing surface 32 and cowl 26 with common radii from the remote axis provide substantially smooth internal surfaces of the inlet for aerodynamic efficiency. While described with respect to the figures at discrete points of extension or retraction, the cowl 26 is smoothly extendible through the entire range from fully retracted to fully extended to allow scheduling of positioning of the cowl to accommodate a range of aircraft speeds up to the design Mach number. Additionally, while the cowl 26 is shown in the exemplary embodiments as internal to the inlet 10, the cowl may be external to the inlet in alternative embodiments. Further, while the inlet 10 in the present embodiments is shown under a fuselage, the inlet may be positioned on a wing or other structure with the compression surface mounted on a surface of that structure.

A method of simultaneous modification of capture area and compression for an aircraft inlet with a fixed compression surface is accomplished for the embodiments disclosed by establishing a leading edge of the inlet on a cowl, step 902. The cowl has a radius from an axis and is engaged with a mating scrubbing surface in the inlet with a second radius from the axis to accommodate the thickness of the cowl, step 904. The aircraft is operated at a design Mach number with the leading edge and cowl fully retracted, step 906. The aircraft is operated at speeds less than the design Mach number with extension of the leading edge over the compression surface, step 908, by rotating the cowl about the axis to simultaneously vary compression and inlet area. Extension of the leading edge may be scheduled from a maximum extended position at subsonic speeds to a fully retracted position at design Mach number, step 910.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An engine inlet for efficient operation at off-design Mach number comprising:
   a fixed compression surface;
   a mating scrubbing surface having a shape defined by a first radius from an axis; and
   a single cowl incorporating a leading edge and having a shape defined by a second radius from the axis concentric with the scrubbing surface, said cowl rotatable about the axis to extend and retract the leading edge across a range of positions from a fully retracted position to a fully extended position over the fixed compression surface to simultaneously vary capture area, compression and shock wave position, said cowl closely received in sliding engagement by the mating scrubbing surface throughout the range of positions.

2. The engine inlet for efficient operation at off-design Mach number as defined in claim 1 wherein the remote axis is perpendicular to a direction of airflow and transverse to the fixed compression surface.

3. The engine inlet for efficient operation at off-design Mach number as defined in claim 1 wherein the leading edge is fully retracted at a design Mach number.

4. The engine inlet for efficient operation at off-design Mach number as defined in claim 1 wherein the leading edge is fully extended at subsonic operation.

5. An aircraft having efficient operation at off-design Mach number comprising:
   an aerodynamic structure;
   an inlet having
      a fixed compression surface mounted on a surface of the aerodynamic structure; and,
      a mating scrubbing surface in the inlet opposite the surface, having a shape defined by a first radius from an axis; and
      a single cowl incorporating a leading edge and having a shape defined by a second radius from the axis concentric with the scrubbing surface, said cowl rotatable about the axis to extend and retract the leading edge across a range of positions from a fully retracted position to a fully extended position over the fixed compression surface to simultaneously vary capture area, compression and shock wave position, said cowl closely received in sliding engagement by the mating scrubbing surface throughout the range of positions.

6. The aircraft having efficient operation at off-design Mach number as defined in claim 5 wherein the remote axis is perpendicular to a direction of airflow and transverse to the fixed compression surface.

7. The aircraft having efficient operation at off-design Mach number as defined in claim 5 wherein the leading edge is fully retracted at a design Mach number.

8. The aircraft having efficient operation at off-design Mach number as defined in claim 5 wherein the leading edge is fully extended at subsonic operation.

9. The aircraft having efficient operation at off-design Mach number as defined in claim 5 wherein the aerodynamic structure is a fuselage and the surface is selected from a bottom surface and a top surface of the fuselage.

10. The aircraft having efficient operation at off-design Mach number as defined in claim 5 wherein the aerodynamic structure is a wing and the surface is selected from a bottom surface of the wing, a top surface of the wing.

11. The aircraft having efficient operation at off-design Mach number as defined in claim 5 wherein the aerodynamic structure is a wing and fuselage and the surface is selected from a top surface of the wing and a side surface of the fuselage.

12. A method for simultaneous modification of capture area and compression for an aircraft inlet with a fixed compression surface comprising
   establishing a leading edge of an inlet on a cowl;
   engaging the cowl with a mating scrubbing surface in the inlet, the scrubbing surface having a shape defined by a radius from an axis and the cowl having shape defined by a second radius from the axis concentric with the scrubbing surface to closely receive the cowl;
   operating an aircraft with the inlet at a design Mach number with the leading edge and cowl fully retracted;
   operating the aircraft at speeds less than the design Mach number; and
   extending the leading edge over the compression surface by rotating the cowl about the axis with the scrubbing surface closely receiving the cowl in sliding engagement throughout the rotation to simultaneously vary compression and inlet area.

13. The method as defined in claim 12 further comprising scheduling extension of the leading edge from a maximum extended position at subsonic speeds to a fully retracted position at design Mach number.

14. The method as defined in claim 12 wherein the compression surface is placed on a fuselage bottom, a fuselage top, a wing top, a wing bottom or a fuselage side.

* * * * *